United States Patent
Brown et al.

(10) Patent No.: US 7,159,919 B2
(45) Date of Patent: Jan. 9, 2007

(54) VEHICLE STORAGE SYSTEM HAVING A LOAD FLOOR ASSEMBLY

(75) Inventors: Steven G. Brown, Birmingham, MI (US); Guy W. Boitos, Bloomfield, MI (US); Brett N. Woodson, Plymouth, MI (US); Jay Ennis, Windsor (CA); Brandon Ye, Windsor (CA)

(73) Assignee: BBI Enterprises, L.P., Bloomfield Hills, MI (US)

( * ) Notice: Subject to any disclaimer, the term of this patent is extended or adjusted under 35 U.S.C. 154(b) by 99 days.

(21) Appl. No.: 10/930,471

(22) Filed: Aug. 31, 2004

(65) Prior Publication Data

US 2005/0077748 A1    Apr. 14, 2005

Related U.S. Application Data

(60) Provisional application No. 60/499,927, filed on Sep. 3, 2003.

(51) Int. Cl.
*B62D 43/00* (2006.01)

(52) U.S. Cl. ................... 296/37.3; 292/37.2

(58) Field of Classification Search ............. 296/37.2, 296/37.3
See application file for complete search history.

(56) References Cited

U.S. PATENT DOCUMENTS

| | | | |
|---|---|---|---|
| 2,011,468 A | 8/1935 | Bronson | |
| 4,423,900 A | 1/1984 | Sugimoto et al. | |
| 5,016,934 A | 5/1991 | Pelz | |
| 5,437,924 A | 8/1995 | Decker, III et al. | |
| 5,836,637 A | 11/1998 | Laginess et al. | |
| 5,971,462 A | 10/1999 | Bell et al. | |
| 6,358,599 B1 | 3/2002 | Deibel et al. | |
| 2001/0046587 A1 | 11/2001 | Michael et al. | |
| 2002/0053810 A1* | 5/2002 | Kaluszka et al. | ......... 296/37.3 |

* cited by examiner

*Primary Examiner*—Joseph D. Pape
(74) *Attorney, Agent, or Firm*—Howard & Howard Attorneys, P.C.

(57) ABSTRACT

A storage system (14) of a motor vehicle (10) presenting a cargo space defining an opening (18) for storing spare tires, tools, and the like. A load floor assembly (22) is configured to cover the opening (18) and to support various loads (41) positioned thereon. A cover (24) of the load floor assembly (22) is molded from a polystyrene or other foam composite. At least one laminate (18), formed from a hard board or other sheet material, is adhered to the cover (24). A support frame (40), formed from a foamed polypropylene, includes a density greater than the density of the cover (24) and therefore has a higher mass to provide a significant amount of structural benefits to the load floor assembly (22) for supporting and preventing a deflection of the cover (24) under the force of the loads (41) applied thereto.

29 Claims, 2 Drawing Sheets

VEHICLE STORAGE SYSTEM HAVING A LOAD FLOOR ASSEMBLY

RELATED APPLICATION

The subject patent application claims priority to and all the benefits of U.S. Provisional Patent Application Ser. No. 60/499,927 filed on Sep. 3, 2003.

FIELD OF THE INVENTION

The subject invention relates generally toward an interior vehicle component, which provides a structural surface. More particularly, the present invention relates toward a load floor of a cargo space of a vehicle.

BACKGROUND OF THE INVENTION

The progression of motor vehicles, such as, for example, sport utilities and station wagons, have included a desire to make full use of available space for storage. One such example is the inclusion of additional storage compartments located in the lower surface of a sport utility vehicle or station wagon. These storage compartments are concealed by a load floor, which must provide structural integrity to support the mass of heavy objects being transported in the rear of the vehicle on top of the load floor. Alternatively, stationary load floors have been used when additional storage area is not available. The use of these load floors have proven to be expensive, heavy, and not structurally sound. Presently, removable load floors are produced from blow molding a polypropylene material, possibly glass-filled, which is extremely heavy and not structurally sound. Alternatively, glass-reinforced polyurethane has also been used. While glass-reinforced polyurethane is typically lighter than blow-molded polypropylene, it is extremely expensive and tends to flex under stress. Additionally, stationary load floors have been manufactured from these materials and have also not provided the physical properties required for use in the motor vehicles. While a tub of the storage compartment does not impede upon the carrying capacity of a rearward storage area, the amount of weight of various loads, which may be positioned on the load floor directly above the tub is limited due to the load carrying capacity of conventional covers. As a result, these various loads of significant weight cannot be placed above the tub.

Various methods and designs have been devised for manufacturing load floors and liners. These methods and designs, disclosed in the U.S. Pat. No. 4,423,900 to Sugimoto et al.; U.S. Pat. No. 5,016,934 to Pelz; U.S. Pat. No. 5,437,924 to Decker, III et al.; U.S. Pat. No. 5,836,637 to Laginess et al; U.S. Pat. No. 5,971,462 to Bell et al.; U.S. Pat. No. 6,358,599 to Deibel et al.; and the U.S. patent application No. 2001/0046587 to Michael are widely used today in the automotive industry.

The U.S. Pat. No. 5,971,462 to Bell, for example, teaches a reinforced cover or load floor for a spare tire storage system having a tub located below a floor of a vehicle. The reinforced cover is formed from blow-molded dual layers. The dual layers are preferably molded from a 30% glass filled polypropylene but can be constructed of any suitable material. The dual layers define an upper surface, which may be carpeted, and a lower surface on opposite sides of the cover. The cover includes a perimeter edge that covers an opening in the floor of a motor vehicle. The cover includes a plurality of reinforcing members that add rigidity to the cover and extend in a radial direction from the center of the cover. The reinforced cover taught by the U.S. Pat. No. 5,971,462 is too complex to manufacture and does not provide a solution to achieve a reinforced cover or a load floor having a reduced mass while maintaining structural integrity at a low cost.

The U.S. patent application No. 2001/0046587 to Michael for example, teaches a laminated structural board. The board includes a semi-rigid foam substrate as a core. Preferably, the semi-rigid foam substrate is molded from polyurethane or other foam composite. Each of the opposing sides of the semi-rigid foam substrate is coated with chopped fiberglass encapsulated between two adhesive layers. The adhesive secures the fiberglass to the semi-rigid foam substrate at the interface and provides outer adhesive layers and additional structural integrity to the semi-rigid foam substrate. Similar to the aforementioned U.S. Pat. No. 5,971,462, the laminated structural board taught by the U.S. patent application No. 2001/0046587 does not provide a solution to achieve a load floor having a reduced mass while maintaining structural integrity at a low cost.

But even with the aforementioned methods and designs, to the extent it is effective, there is always need for improvements in a load floor that is less expensive, lighter, and more structurally sound than materials presently being used in the methods and designs taught by the aforementioned patens.

SUMMARY OF THE INVENTION

A motor vehicle includes a floor panel and a storage system defined in the floor panel. A tub portion is located below the floor panel and presenting a cargo space defining an opening. A load floor assembly includes a cover having a cover density, which presents opposite surfaces extending to a peripheral edge and closing said opening for supporting various loads positioned thereon. A support frame connected to the peripheral edge of the cover. The support frame has a density greater than the cover density for supporting and preventing a deflection of the cover under the force of the loads applied thereto.

An advantage of the present invention is to provide a load floor assembly of a reduced mass having benefits derived from using a low density cover combined with a higher density support frame, i.e. a skirt to provide the load floor assembly having a reduced mass while having structural integrity at a low cost.

Another advantage of the present invention is to provide the support frame or a skirt having structural integrity that mimics a I-beam used in the construction industry to withstand the force of various loads applied to the cover and to prevent a deflection of the cover under the force of the loads applied thereto.

Still another advantage of the present invention is to provide a storage system for a vehicle, which does not limit the weight of a cargo carried within a rear storage area of a mini-van, van, sport utility vehicle, station wagon, or the like.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
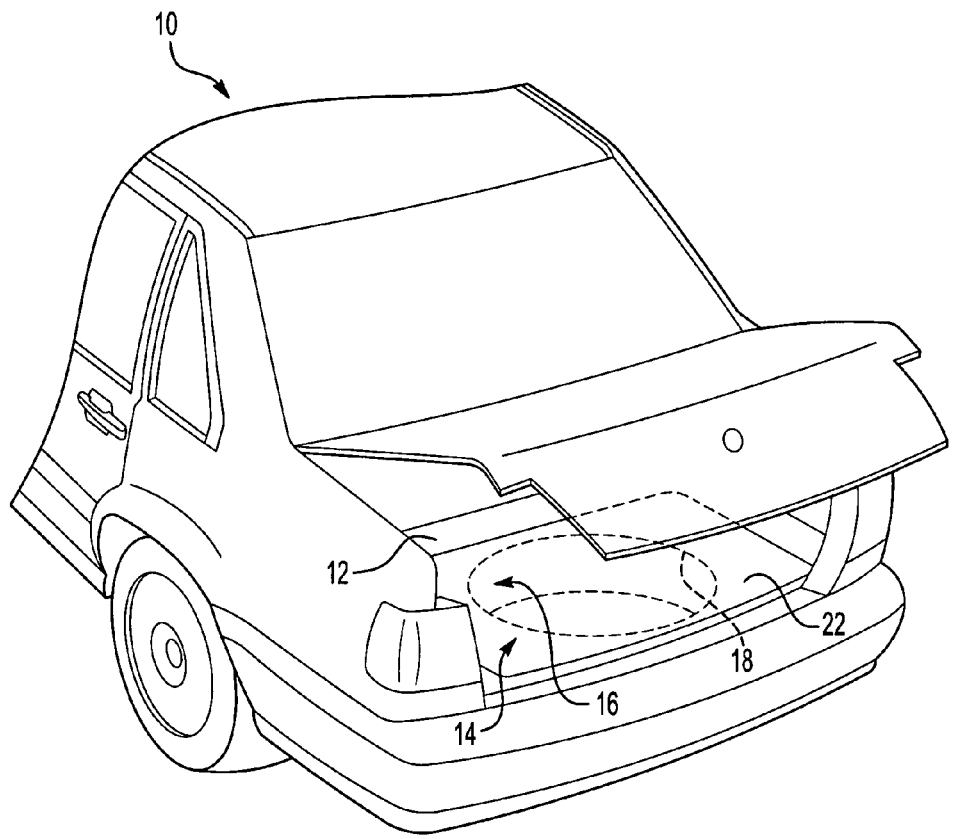
FIG. 1 is a fragmentary environmental view illustrating a motor vehicle that includes a storage system having a tub portion for storing tires, cargo, or the like and a load floor assembly of the storage system covering the tub portion.
Figure 2:
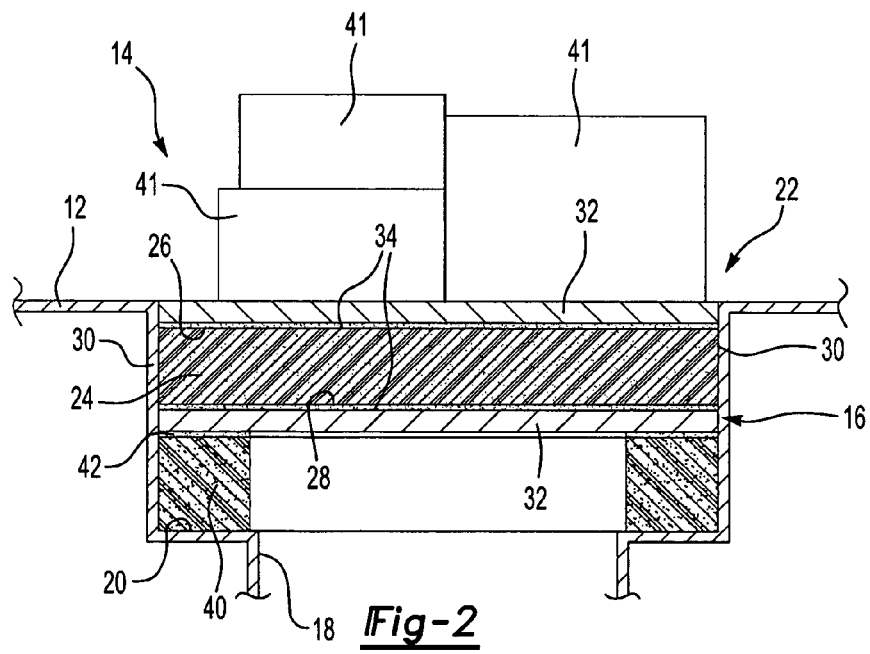
FIG. 2 is a perspective view of the load floor assembly showing a skirt.

Referring to the FIGS. 1 and 2, wherein like numerals indicate like or corresponding parts, a motor vehicle of the present invention is generally shown at 10. A floor panel 12 of the motor vehicle 10 includes a storage system, generally indicated at 14, defined in the floor panel 12. A tub portion, generally indicated at 16, of the storage system 14 is located below the floor panel 12. The tub portion 16 presents a cargo space defining an opening 18 for storing a spare tire, a tool box, or the like. The tub portion 16 presents a peripheral notch 20, as best shown in FIG. 2.

Figure 3:
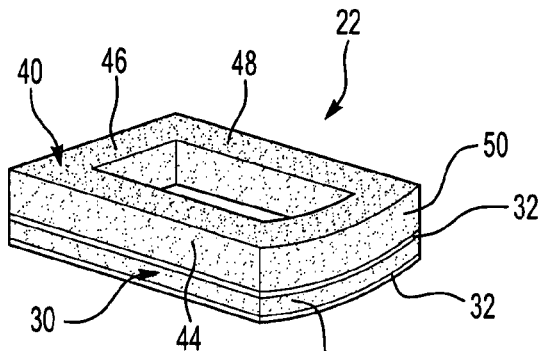
FIG. 3 is a cross-sectional view of the load floor assembly along line 3—3 of FIG. 2 with the load floor assembly supporting the cargo.
Figure 4:
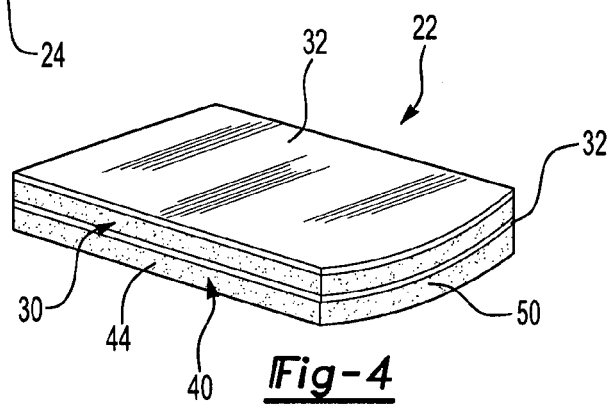
FIG. 4 is a perspective view of the load floor assembly showing a laminate.
Figure 5:
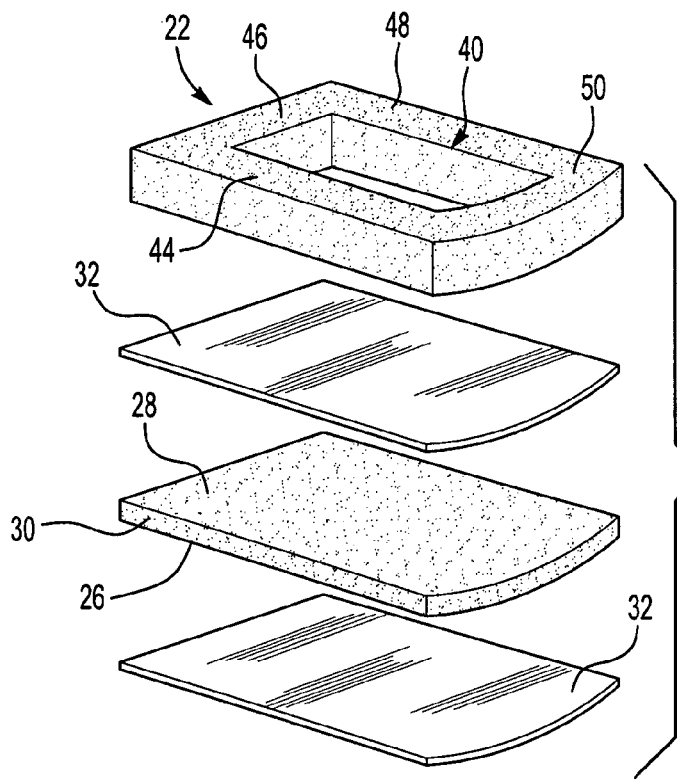
FIG. 5 is an exploded view of the load floor assembly.

As illustrated in FIGS. 2 through 5, a load floor assembly of the present invention is generally shown at 22. The load floor assembly 22 includes a cover 24 presenting opposite surfaces 26, 28 of a generally planar configuration. The cover 24 includes a peripheral edge, generally indicated at 30, configured to cover the opening 18. The cover 24 may include rectangular or circular configurations, or, for example a rectangular configuration with only one side presenting a beveled contour, as shown in FIGS. 3 through 5. Preferably, the cover 24 is molded from a polystyrene or other foam composite having a low density to reduce the mass of the load floor assembly 22. A preferred density of the cover 24 ranges between 1.3 and 2.0 lbs per cubic foot. At least one reinforcing layer or laminate 32 is adhered to one of the opposite surfaces 26 of the cover 24. Preferably, the laminate 32 is formed from a hard board or other sheet material and includes rigid properties. Further, to provide additional integrity to the load floor assembly 22, another laminate 32 is adhered to the other of the opposite surfaces 28 of the cover 24. An adhesive layer 34 is used to adhere each laminate 32 to each opposite surface 26, 28 of the cover 24 to provide significant structural durability of the cover 24 to derive a significant increase in structural integrity of the cover 24.

As alluded to the above, a support frame or a skirt of the load floor assembly 22 is generally indicated at 40. The support frame 40 is connected to the cover 24 to provide additional structural integrity to the load floor assembly 22 and for supporting and preventing a deflection of the cover 24 under the force of various loads 41 applied thereto. Preferably, the support frame 40 is adhered to one of the laminates 32 with a third adhesive layer 42. However, it is possible to adhere the support frame 40 directly to the cover 24 if a single laminate 32 is used with the load floor assembly 22 (not shown). In this case, the support frame 40 is affixed to the cover 24 with an adhesive or by an integrated molding process, as known to those of skill in the art. Alternatively, the load floor assembly 22 may include a plurality of openings (not shown) that extend through the cover 24 and the support frame 40 to receive male connectors (not shown) extending through the opening to secure the load floor assembly 22 to the floor panel 12.

The support frame 40 presenting side walls 44, 46, 48, 50 having a rectangular configuration as viewed in a cross section. Each of the side walls 44, 46, 48, 50 extends outwardly from and is perpendicular to the cover 24 to withstand the force of the loads applied to the cover 24 and to provide structural support to the cover 24. The rectangular configuration of the support frame 40 complements with the rectangular configuration of the peripheral notch of the tub portion. Similarly the cover 24, the support frame 40 may include rectangular or circular configurations, or, for example a rectangular configuration with only one side presenting a beveled contour to complement with the cover 24, as shown in FIGS. 3 through 5. Preferably, the support frame 40 is formed from a foamed polypropylene having a density of between 3.5 and 4.5 lbs per cubic foot. Alternatively, an olefin based materials may also be used separately or in combination with the polypropylene foam to eliminate or reduce the potential for squeaks between the support frame 40 and the vehicle floor the support frame 40 rests against.

The support frame 40 includes a greater density than the cover 24 and therefore has a higher mass. However, due to the higher density, the support frame 40 provides a significant amount of structural benefits to the load floor assembly 22. As illustrated in FIG. 4, the support frame 40 aligns with the peripheral edge of the cover 24. Alternatively, the support frame 40 is inset from the peripheral edge of the cover 24 (not shown). The geometrical configuration of the support frame 40 in combination with the laminate 18 and the cover 24 has provided an unexpectedly significant increase in structural integrity via a shortened bending moment along with providing a mass reduction over presently used load floor assemblies. Further, the materials selected are significantly less expensive than blow molded polypropylene or polyurethane reinforced with glass strands. Additionally, the load floor assembly 22 is covered either entirely or partially with a decorative fabric or other material (not shown) to improve the esthetics of the load floor assembly 22 to match a lining (not shown) in the storage compartment. Alternatively, the support frame 40 is also formed from a dark colored foamed polypropylene to eliminate the need for the use of the aforementioned decorative fabric over the support frame 40. Therefore, the reduced mass benefits derived from using the low density cover 24 when combined with the higher density support frame 40 provides the load floor assembly 22 having a reduced mass while having structural integrity at a low cost.

As alluded to the above, a deflection testing unexpectedly showed a significant improvement to the presently used load floor assemblies. Most significantly, a load-deflection test was conducted by evenly distributing 376 Kg over the cover 24 of the load floor assembly 22. Only 1 mm of deflection was shown at the end of the load-deflection test. This unexpected result was achieved by a load floor that included a total mass of only 3.65 Kg. Prior testing conducted upon state of the art technology, i.e., blow molded, glass reinforced polyurethane produced deflections of more than 10 mm prompting at least one original equipment manufacturer of automotive vehicles to lower the amount of deflection allowed from a load-deflection test from 10 mm to from between 4 and 6.5 mm.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A motor vehicle comprising;
   a floor panel,
   a tub portion located below said floor panel and presenting a cargo space having an opening in said floor panel,
   a cover having a cover density and presenting opposite surfaces extending to a peripheral edge and closing said opening for supporting various loads positioned thereon, and
   a support frame connected to said peripheral edge of said cover, said cover and said support frame are formed from an organic polymeric material, and
   said frame having a density greater than said cover density for supporting and preventing a deflection of said cover under the force of the loads applied thereto.

2. A motor vehicle as set forth in claim 1 wherein said cover and said support frame are bonded together.

3. A motor vehicle as set forth in claim 2 including an adhesive material between said cover and said support frame.

4. A motor vehicle as set forth in claim 3 wherein said support frame includes a density of between 3.5 and 4.5 lbs/ft$^3$.

5. A motor vehicle as set forth in claim 4 wherein said density of said cover is between 1.3 and 2.0 lbs/ft$^3$.

6. A motor vehicle as set forth in claim 5 wherein said support frame presents a rectangular configuration in cross section.

7. A motor vehicle as set forth in claim 6 wherein said cross section includes side walls extending outwardly from and perpendicular to said cover to withstand the force of the loads applied to said cover and to provide structural support to said cover.

8. A motor vehicle as set forth in claim 7 wherein said tub portion includes a peripheral ledge for receiving and supporting said support frame.

9. A motor vehicle as set forth in claim 8 including at least one reinforcing layer adhered to each of said opposite surfaces and engaging said cover between said reinforcing layers with one of said reinforcing layers extending between said support frame and said cover.

10. A motor vehicle as set forth in claim 3 wherein said first polymeric material is an expanded polypropylene foam.

11. A motor vehicle as set forth in claim 10 wherein said second polymeric material is polystyrene.

12. A motor vehicle as set forth in claim 11 wherein said first polymeric material further includes an olefin polymer.

13. A motor vehicle as set forth in claim 12 including a pair of adhesive layers each continuously extending between said cover and each of said reinforcing layers adhering said cover with said reinforcing layers.

14. A motor vehicle as set forth in claim 12 including a third adhesive layer extending between one of said reinforcing layers and said support frame.

15. A load floor assembly for a storage system of a motor vehicle having a floor and a tub portion located below the floor with the tub portion presenting a cargo space defining an opening, said load floor comprising;
   a cover of a first polymeric material having a cover density and presenting opposite surfaces extending to a peripheral edge for closing the opening for supporting various loads positioned thereon, and
   a support frame of a second polymeric material connected to said peripheral edge of said cover,
   said support frame having a density greater than said cover density for supporting and preventing a deflection of said cover under the force of the loads applied thereto.

16. A motor vehicle as set forth in claim 15 wherein said cover and said support frame are formed from an organic polymeric material.

17. A motor vehicle as set forth in claim 16 wherein said cover and said support frame are bonded together.

18. A motor vehicle as set forth in claim 17 including an adhesive material between said cover and said support frame.

19. A motor vehicle as set forth in claim 18 wherein said support frame includes a density of between 3.5 and 4.5 lbs/ft$^3$.

20. A motor vehicle as set forth in claim 19 wherein said density of said cover is between 1.3 and 2.0 lbs/ft$^3$.

21. A motor vehicle as set forth in claim 20 wherein said support frame presents a rectangular configuration in cross section.

22. A motor vehicle as set forth in claim 21 wherein said cross section includes side walls extending outwardly from and perpendicular to said cover to withstand the force of the loads applied to said cover and to provide structural support to said cover.

23. A motor vehicle as set forth in claim 22 wherein said tub portion includes a peripheral ledge for receiving and supporting said support frame.

24. A motor vehicle as set forth in claim 23 including at least one reinforcing layer adhered to each of said opposite surfaces and engaging said cover between said reinforcing layers with one of said reinforcing layers extending between said support frame and said cover.

25. A motor vehicle as set forth in claim 18 wherein said first polymeric material is an expanded polypropylene foam.

26. A motor vehicle as set forth in claim 25 wherein said second polymeric material is polystyrene.

27. A motor vehicle as set forth in claim 26 wherein said first polymeric material further includes an olefin polymer.

28. A motor vehicle as set forth in claim 27 including a pair of adhesive layers each continuously extending between said cover and each of said reinforcing layers adhering said cover with said reinforcing layers.

29. A motor vehicle as set forth in claim 28 including a third adhesive layer extending between one of said reinforcing layers and said support frame.

* * * * *

UNITED STATES PATENT AND TRADEMARK OFFICE
CERTIFICATE OF CORRECTION

| | |
|---|---|
| PATENT NO. | : 7,159,919 B2 |
| APPLICATION NO. | : 10/930471 |
| DATED | : January 9, 2007 |
| INVENTOR(S) | : Steven G. Brown et al. |

It is certified that error appears in the above-identified patent and that said Letters Patent is hereby corrected as shown below:

In column 5, line 54, please delete the word "olefin" and insert the word --olefinic--.

In column 6, line 51, please delete the word "olefin" and insert the word --olefinic--.

Signed and Sealed this

First Day of April, 2008

JON W. DUDAS
*Director of the United States Patent and Trademark Office*